US012640487B2

(12) United States Patent
Nilsson

(10) Patent No.: US 12,640,487 B2
(45) Date of Patent: May 26, 2026

(54) ANTENNA FOR WIRELESS COMMUNICATIONS INTEGRATED IN ELECTRONIC DEVICE

(71) Applicant: Cochlear Limited, Macquarie University (AU)

(72) Inventor: Sören Nilsson, Mölnlycke (SE)

(73) Assignee: Cochlear Limited, Macquarie University (AU)

( * ) Notice: Subject to any disclaimer, the term of this patent is extended or adjusted under 35 U.S.C. 154(b) by 380 days.

(21) Appl. No.: 18/321,183

(22) Filed: May 22, 2023

(65) Prior Publication Data

US 2023/0299493 A1 Sep. 21, 2023

Related U.S. Application Data

(62) Division of application No. 16/767,069, filed as application No. PCT/IB2018/060296 on Dec. 19, 2018, now Pat. No. 11,695,213.

(60) Provisional application No. 62/609,001, filed on Dec. 21, 2017.

(51) Int. Cl.

| | |
|---|---|
| ***H01Q 13/18*** | (2006.01) |
| ***H01Q 7/00*** | (2006.01) |
| ***H04R 25/00*** | (2006.01) |

(52) U.S. Cl.

CPC ............... *H01Q 13/18* (2013.01); *H01Q 7/00* (2013.01); *H04R 25/554* (2013.01); *H04R 25/558* (2013.01); *H04R 2225/51* (2013.01)

(58) Field of Classification Search

CPC ........ H01Q 7/00; H01Q 13/18; H04R 25/554; H04R 25/558; H04R 2225/51

See application file for complete search history.

(56) References Cited

U.S. PATENT DOCUMENTS

| | | | | |
|---|---|---|---|---|
| 10,103,445 | B1 * | 10/2018 | Gregoire ................ | H01Q 21/08 |
| 10,826,187 | B1 | 11/2020 | Godard | |
| 11,695,213 | B2 * | 7/2023 | Nilsson .................... | H01Q 7/00 343/718 |
| 2003/0030589 | A1 | 2/2003 | Zurcher et al. | |
| 2005/0135645 | A1 | 6/2005 | Niederdrank | |
| 2013/0050031 | A1 * | 2/2013 | Zhu ...................... | H01Q 1/2266 343/702 |

FOREIGN PATENT DOCUMENTS

| | | | |
|---|---|---|---|
| EP | 2367294 | A1 | 9/2011 |
| EP | 2640094 | B1 | 9/2013 |
| KR | 10-2008-0100967 | A | 11/2008 |

OTHER PUBLICATIONS

International Search Report and Written Opinion, Int'l Application No. PCT/IB2018/060296, dated Apr. 30, 2019, in 11 pages.

* cited by examiner

*Primary Examiner* — Dimary S Lopez Cruz
*Assistant Examiner* — Amal Patel
(74) *Attorney, Agent, or Firm* — Knobbe, Martens, Olson & Bear, LLP

(57) ABSTRACT

An apparatus includes a housing and a circuit including an inductor and at least one capacitor in electrical communication with the inductor. The circuit has a resonance frequency and bounds a non-electrically-conductive region of the housing. The circuit is configured to be operable as an antenna.

11 Claims, 11 Drawing Sheets

ANTENNA FOR WIRELESS COMMUNICATIONS INTEGRATED IN ELECTRONIC DEVICE

BACKGROUND

Field

The present application relates generally to antennas of electronic devices for wireless communications, and more particularly to antennas of implantable and non-implantable medical devices for wireless communications.

Description of the Related Art

Various electronic devices, e.g., implantable and non-implantable medical devices, include one or more antennas for wireless communication between the electronic device and other components of the electronic system.

SUMMARY

In one aspect disclosed herein, an apparatus is provided which comprises a housing and a circuit. The circuit comprises an inductor and at least one capacitor in electrical communication with the inductor. The circuit has a resonance frequency and bounds a non-electrically-conductive region of the housing. The circuit is configured to be operable as an antenna.

In another aspect disclosed herein, an apparatus is provided which comprises an electrically conductive layer, a dielectric region, and at least one capacitor. The dielectric region is within the electrically conductive layer. The at least one capacitor is in electrical communication with the electrically conductive layer to form a circuit having a resonance frequency and configured to be operable as an antenna.

In still another aspect disclosed herein, a method is provided which comprises wirelessly receiving a first plurality of electromagnetic signals at an electrically conductive structure of an electronic device. The electrically conductive structure circumscribes a non-electrically-conductive material, and the electrically conductive structure has a resonance frequency. The method further comprises resonantly coupling the first plurality of electromagnetic signals with the electrically conductive structure. The method further comprises generating a first plurality of electrical signals in response to the first plurality of electromagnetic signals. The method further comprises operating the electronic device in response to the first plurality of electrical signals.

BRIEF DESCRIPTION OF THE DRAWINGS

Embodiments are described herein in conjunction with the accompanying drawings, in which.

DETAILED DESCRIPTION

Certain embodiments described herein provide a cavity resonator that is configured to be operable as an antenna for wireless communications, with the cavity resonator located within a housing of an electronic device (e.g., a medical device, an auditory prosthesis, a component of an auditory prosthesis, a battery) or within an electrically conductive layer of the electronic device. The cavity resonator comprises a circuit comprising an inductor (e.g., an electrically conductive portion of the housing) and at least one capacitor in electrical communication with the inductor. The circuit has a resonance frequency and bounds a non-conductive region of the housing (e.g., an air-filled cavity within the electrically conductive portion of the housing), with the cavity extending to an opening at a surface of the housing and the at least one capacitor extending across the opening. Certain such embodiments advantageously provide an inexpensive antenna that is smaller than conventional on-board antennas and has less rigid constraints regarding the space surrounding the antenna, which can facilitate fabrication of smaller electronic devices. For example, a conventional 2.4 GHz chip antenna often utilizes a certain volume (e.g., about 1 $cm^3$) that is free from metal or other conductive materials, and this feature can represent a constraint to miniaturizing the electronic device containing the chip antenna. Certain embodiments described herein permit the volume dedicated to the antenna to be significantly smaller (e.g., by about 5-10% or more) while providing sufficient antenna performance.

Figure 1A:
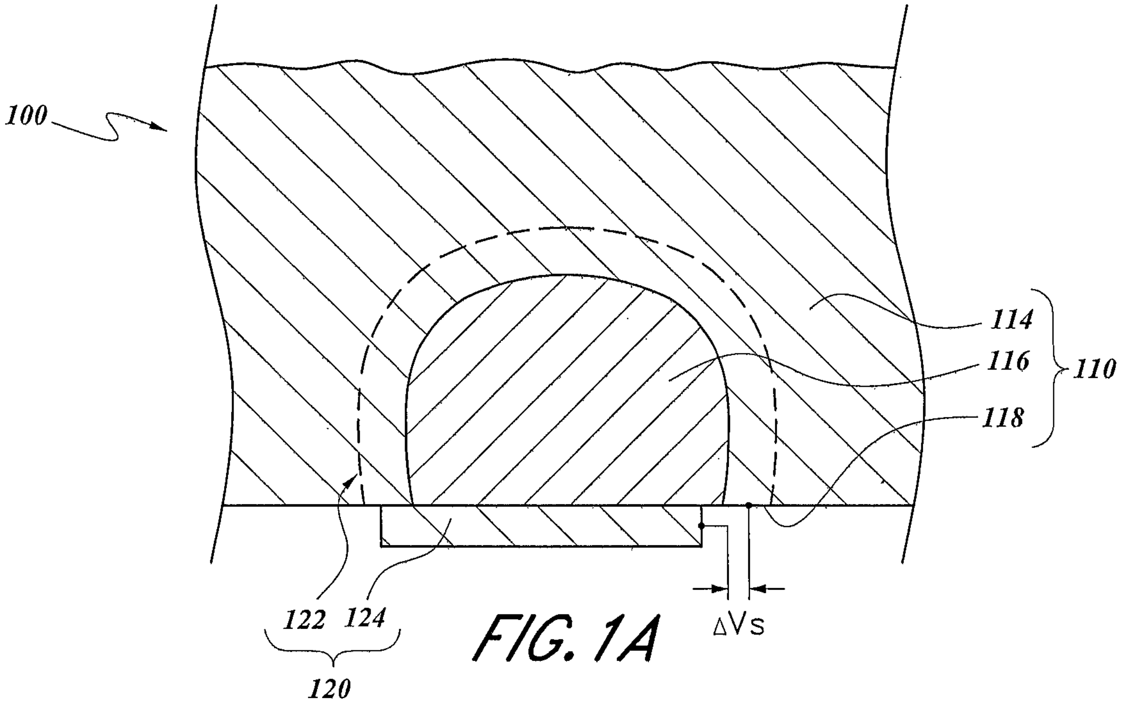
FIGS. 1A and 1B schematically illustrate top views of portions of two example apparatus in accordance with certain embodiments described herein.
Figure 1B:
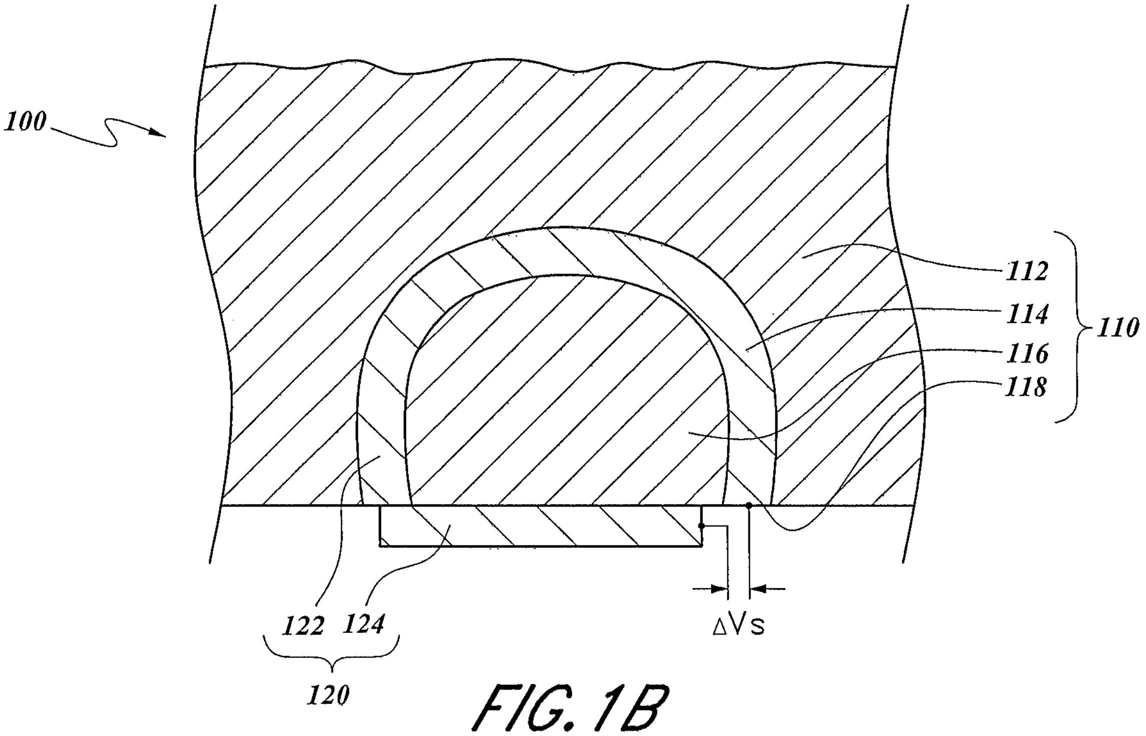

FIGS. 1A and 1B schematically illustrate top views of portions of two example apparatus 100 in accordance with certain embodiments described herein. The apparatus 100 comprises a housing 110 and a circuit 120 comprising an inductor 122 and at least one capacitor 124 in electrical communication with the inductor 122. The circuit 120 has a resonance frequency, is bounding a non-conductive region 116 of the housing 110, and is configured to be operable as an antenna.

In certain embodiments, the apparatus 100 comprises an electronic device selected from the group consisting of: a medical device, an auditory prosthesis, a hearing aid, a cochlear implant system, a component of an auditory prosthesis, a sound processor of an auditory prosthesis, an actuator of an auditory prosthesis, a magnetic coupler of an auditory prosthesis, a microphone of an auditory prosthesis, a battery, and a rechargeable battery. For example, the apparatus 100 can be an implantable component of an auditory prosthesis or a non-implantable component of an auditory prosthesis.

In certain embodiments, the housing 110 comprises one or more portions which form an enclosure containing some or all of the other components of the apparatus 100. Some or all of the portions of the housing 110 in certain embodiments comprise a non-electrically-conductive material (e.g., a dielectric material, ceramic, plastic, polymer), while some or all of the portions of the housing 110 in certain other embodiments comprise an electrically conductive material (e.g., metal). For example, as schematically illustrated by FIG. 1B, a non-electrically-conductive portion 112 of the housing 110 can comprise a non-electrically-conductive material and an electrically conductive portion 114 of the housing 110 can comprise an electrically conductive material which borders (e.g., extends along a boundary of) a non-electrically-conductive region 116 of the housing 110. In certain embodiments, during operation of the apparatus 100, the electrically conductive portion 112 of the housing 110 is at an electrical reference (e.g., ground) voltage of the apparatus 100.

In both FIGS. 1A and 1B, the non-electrically-conductive region 116 is within the inductor 122. In FIG. 1A, the non-electrically-conductive region 116 is within the electrically conductive portion 114 of the housing 110, and in FIG. 1B, the non-electrically-conductive region 116 is within the inductor 122, and the inductor 122 is within the non-electrically-conductive portion 112 of the housing 110.

In certain embodiments, the inductor 122 comprises at least an electrically conductive portion of the housing 110 (e.g., the electrically conductive portion 114 schematically illustrated by FIGS. 1A and 1B) having an inductance L and bordering (e.g., extending along a boundary of) the non-electrically-conductive region 116 of the housing 110. For example, the inductor 122 can comprise some or all of the electrically conductive portion 114 of the housing 110 (e.g., all of the electrically conductive material as schematically illustrated in FIG. 1B; a portion of the electrically conductive material as schematically illustrated in FIG. 1A with the portion denoted as being between a dashed line and the non-electrically-conductive region 116). The electrically conductive portion 114 of the housing 110 can comprise a portion of at least one surface 118 of the housing 110. The inductance L can be dependent on the size, shape, and configuration of the electrically conductive portion 114 (e.g., longer sides of the electrically conductive portion 144 can correspond to higher inductances).

In certain embodiments, the non-electrically-conductive region 116 of the housing 110 comprises a solid dielectric material (e.g., ceramic, plastic, polymer), while in certain other embodiments, the non-electrically conductive region 116 of the housing 110 comprises a cavity comprising air. Since the non-electrically-conductive region 116 comprises a portion of the housing 110, a shape of the non-electrically-conductive region 116 can generally conform to the shape of the housing 110. For example, in certain embodiments in which the non-electrically-conductive region 116 is within a planar portion of the housing 110, the non-electrically-conductive region 116 is also planar. In certain embodiments in which the non-electrically-conductive region 116 is within a non-planar (e.g., curved) portion of the housing 110, the non-electrically-conductive region 116 is also non-planar (e.g., curved).

The at least one capacitor 124 of certain embodiments comprises one or more electrical components having a capacitance C (e.g., about 5-10 pF) and being in electrical communication with the inductor 122. The at least one capacitor 124 can be located at the surface 118 of the housing 110, as schematically illustrated by FIGS. 1A and 1B. For example, the at least one capacitor 124 can have a first end in electrical communication with a first portion of the inductor 122 at the surface 118 and a second end in proximity to a second portion of the inductor 122 at the surface 118, with the at least one capacitor 124 bordering (e.g., extending along a boundary of) the non-electrically-conductive region 116, such that the circuit 120 comprising the inductor 122 and the at least one capacitor 124 is bounding (e.g., encircling; circumscribing) the non-electrically-conductive region 116 of the housing 110. In certain embodiments, the circuit 120 further comprises one or more electrical conduits (not shown) that are configured to transmit electrical signals $\Delta V_s$ (e.g., relative to a reference voltage such as a ground voltage) between the circuit 120 and antenna circuitry (not shown) of the apparatus 100. For example, the one or more electrical conduits can comprise a pair of electrical conduits (e.g., a coaxial cable), wherein a signal electrical conduit (e.g., the signal conduit of the coaxial cable) is in electrical communication with the second end of the at least one capacitor 124 and a reference electrical conduit (e.g., the shielding conduit of the coaxial cable) is in electrical communication with the second portion of the inductor 22 at the surface 118. In certain embodiments in which the non-electrically-conductive region 116 comprises a cavity comprising air, the non-electrically-conductive region 116 further comprises an opening at the surface 118 of the housing 110, and the at least one capacitor 124 extends across the opening. In certain embodiments, the at least one capacitor 124 is configured for the function of the circuit 120 as an antenna, and the apparatus 100 further comprises other electrical components (e.g., antenna circuitry) that are configured for other purposes (e.g., signal matching).

FIGS. 2A-2D schematically illustrate perspective views of four example slab-shaped portions 200 of the housing 110 in accordance with certain embodiments described herein. Each of the slab-shaped portions 200 of FIGS. 2A-2D has a non-electrically-conductive region 116 comprising a cavity 210 comprising air in accordance with certain embodiments described herein. The cavity 210 can comprise an opening 212 at a surface 118 of the housing 110, and the at least one capacitor 124 can extend along the opening 212, as schematically illustrated by FIGS. 2A-2D. While FIGS. 2A-2D schematically illustrate examples in which the non-electrically-conductive region 116 comprises a cavity 210 comprising air, in certain other embodiments, the non-electrically-conductive region 116 comprises a solid non-electrically-conductive material (e.g., ceramic, plastic, polymer). Also, while FIGS. 2A-2D schematically illustrate generally planar, rectilinear configurations of the housing 110 and other portions of the apparatus 100 (e.g., one or more of the non-electrically-conductive portion 112, electrically conductive portion 114, non-electrically-conductive region 116, surface 118, circuit 120, inductor 122, at least one capacitor 124, cavity 210, and opening 212), other configurations compatible with certain embodiments described herein have non-planar (e.g., curved) and/or non-rectilinear (e.g., curved, irregular) configurations of the housing 110 and/or one or more of the other portions of the apparatus 100. For example, one or more of the housing 110 and the other portions of the apparatus 100 can have a configuration, shape, and/or dimensions that are configured to facilitate operation of the apparatus 100 as an antenna having a predetermined radiative pattern for communications of electromagnetic signals having a predetermined frequency range.

Figure 2A:
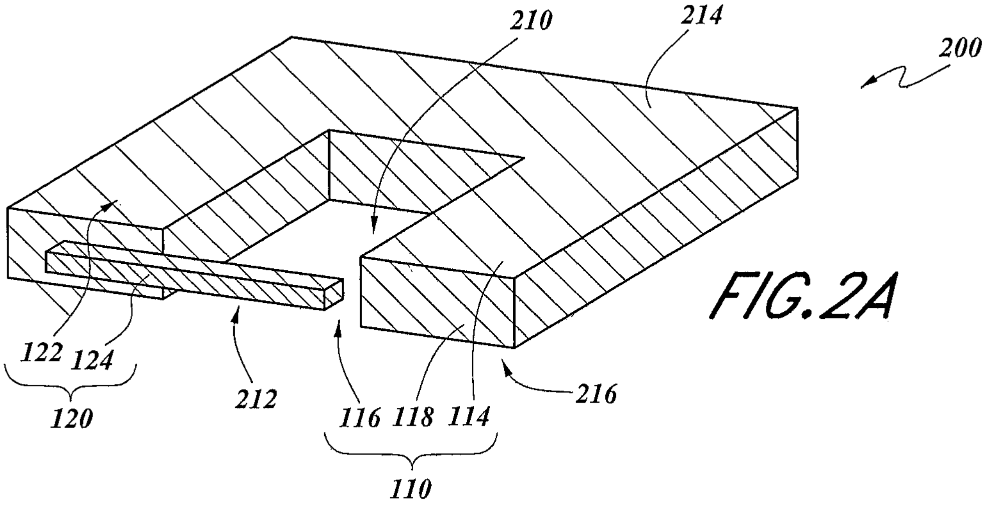
FIGS. 2A-2D schematically illustrate perspective views of four example slab-shaped portions of the housing in accordance with certain embodiments described herein.
Figure 2B:
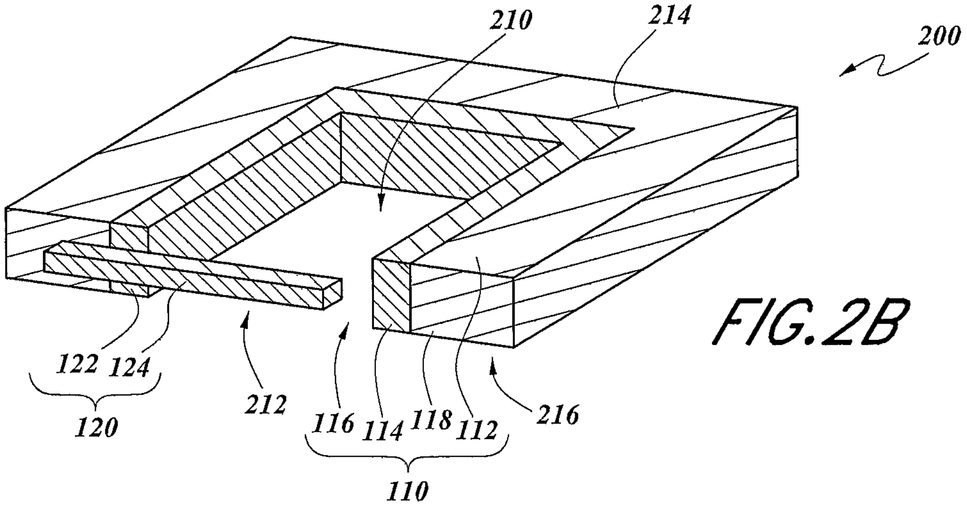

FIG. 2A schematically illustrates an example portion 200 of the housing 110 corresponding to the example housing 110 shown schematically in the top view of FIG. 1A, and FIG. 2B schematically illustrates an example portion 200 of the housing 110 corresponding to the example housing 110 shown schematically in the top view of FIG. 1B. In both FIGS. 2A and 2B, the cavity 210 extends to a first surface 214 of the housing 110 and to a second surface 216 of the housing 110 opposite to the first surface 214.

Figure 2C:
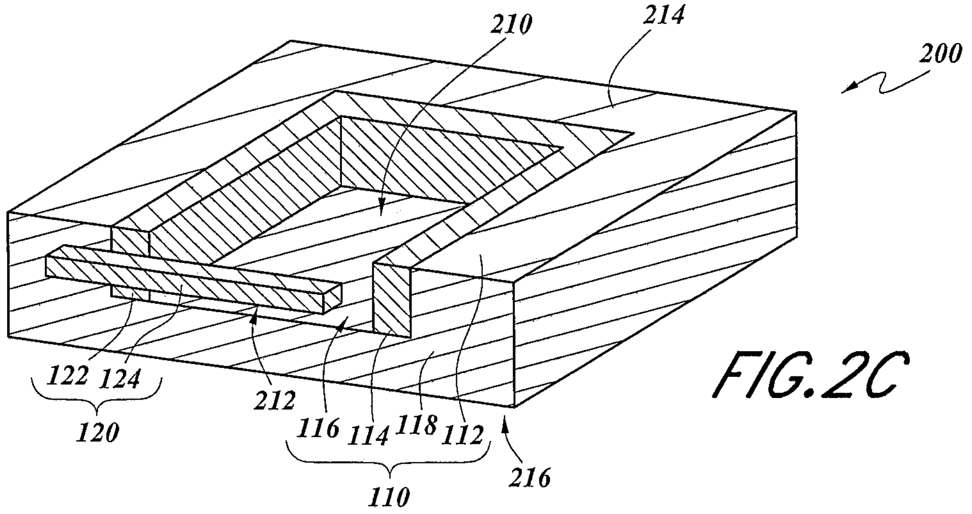
Figure 2D:
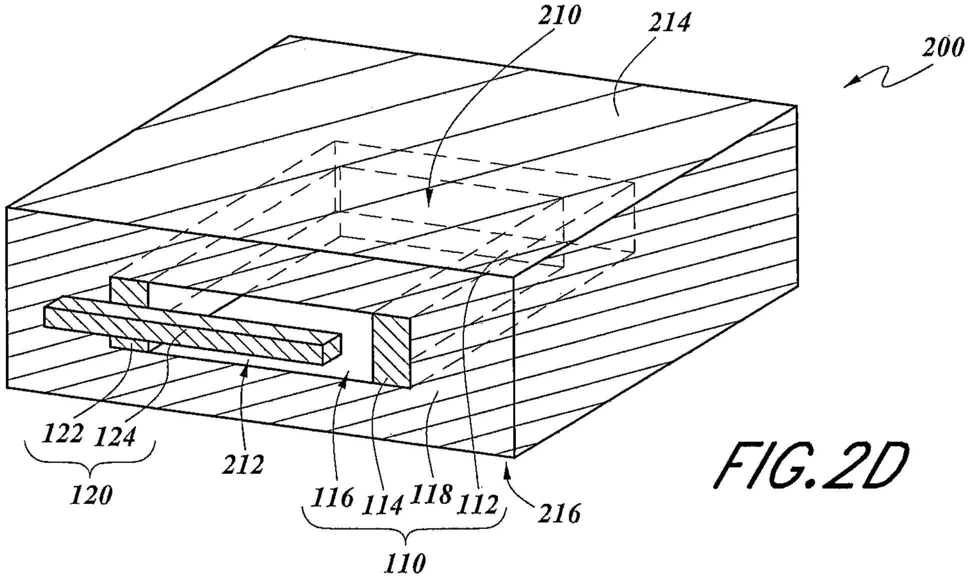

FIG. 2C schematically illustrates an example portion 200 of the housing 110 in which the cavity 210 extends to the first surface 214 of the housing 110 but does not extend to the opposite second surface 216 of the housing 110. FIG. 2D schematically illustrates an example portion 200 of the housing 110 in which the cavity 210 does not extend to either the first surface 214 of the housing 110 or the opposite second surface 216 of the housing 110.

In each of FIGS. 2A-2D, the non-electrically-conductive region 116 is within the housing 110. For example, in each of FIGS. 2A-2B, the cavity 210 is within the electrically conductive portion 114 of the housing 110. For another example, in each of FIGS. 2C-2D, the cavity 210 is within the electrically conductive portion 114 of the housing 110, and the electrically conductive portion 114 of the housing 110 is within a non-electrically-conductive portion 112 of the housing 110.

The circuit 120 comprising the inductor 122 and the at least one capacitor 124 can be considered to be an "LC" or "RLC" resonant circuit having a resonance frequency $f_0=1/2\pi\sqrt{LC}$, with $f_0$ in units of hertz, L in units of henrys, and C in units of farads. In certain embodiments (e.g., in which the non-electrically-conductive region 116 comprises a cavity comprising air), the circuit 120 can be considered to be a "cavity resonator."

In certain embodiments, the inductance L and the capacitance C of the circuit 120 are selected such that the resonance frequency is in a range between 2 GHz and 6 GHz (e.g., compatible with Bluetooth® wireless communication schemes). Other ranges of resonance frequencies and other wireless communication schemes are also compatible with certain embodiments described herein. The circuit 120 can be configured to be operable as an antenna (e.g., by transmitting and/or receiving electromagnetic signals, at least some of which have a frequency equal to or within 10% of the resonance frequency). For example, the circuit 120 can be configured to wirelessly transmit electromagnetic signals to a controller spaced from the housing 110, to receive wirelessly transmitted electromagnetic signals from the controller, or both. In certain such embodiments, the controller is spaced from the housing 110, and is configured to wirelessly transmit electromagnetic signals to the circuit 120, to receive wirelessly transmitted electromagnetic signals from the circuit 120, or both.

As described herein, in certain embodiments, the circuit 120 is formed within the housing 110 of an apparatus 100. The inductor 122 can comprise an electrically conductive portion 114 of the housing 110 which provides the inductance for the circuit 120. For example, as schematically illustrated by FIGS. 1A and 2A-2B, the inductor 122 can comprise a portion of an electrically conductive layer (e.g., slab, plate). For another example, as schematically illustrated by FIGS. 1B and 2C-2D, the inductor 122 can comprise an electrically conductive material between and bordering the non-electrically-conductive region 116 and a non-electrically-conductive portion 112 of a non-electrically-conductive layer (e.g., slab, plate).

Figure 3A:
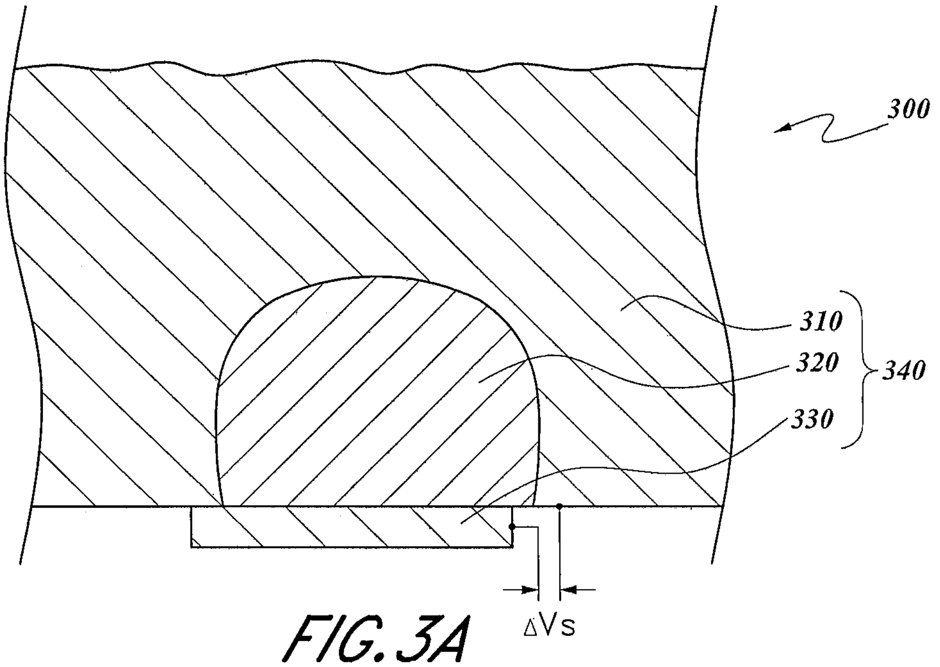
FIG. 3A schematically illustrates a top view of an example portion of an apparatus in accordance with certain embodiments described herein.
Figure 3B:
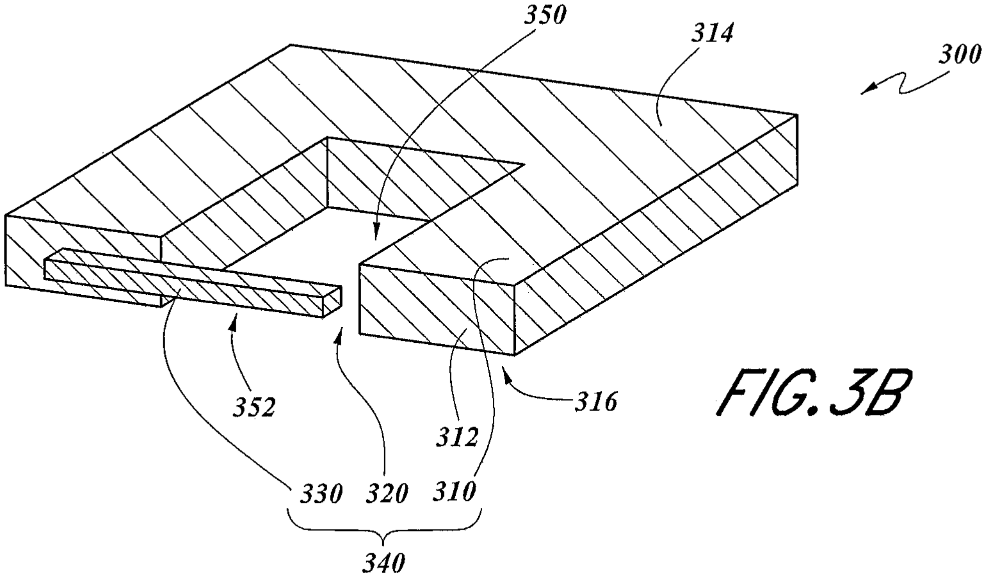
FIG. 3B schematically illustrates a perspective view of an example slab-shaped portion of an apparatus in which the dielectric region comprises a cavity comprising air in accordance with certain embodiments described herein.

In certain other embodiments, the circuit 120 is formed within an electrically conductive layer (e.g., slab, plate) of the apparatus 100 without being formed within the housing 110 of the apparatus 100. FIG. 3A schematically illustrates a top view of an example portion of an apparatus 300 in accordance with certain embodiments described herein. The apparatus 300 comprises an electrically conductive layer 310 (e.g., slab, plate) and a dielectric region 320 within the electrically conductive layer 310. The apparatus 300 further comprises at least one capacitor 330 in electrical communication with the electrically conductive layer 310 to form a circuit 340 having a resonance frequency and configured to be operable as an antenna. FIG. 3B schematically illustrates a perspective view of an example slab-shaped portion of an apparatus 300 in which the dielectric region 320 comprises a cavity 350 comprising air in accordance with certain embodiments described herein.

The apparatus 300 schematically illustrated in FIGS. 3A-3B can be similar to the apparatus 100 schematically illustrated in FIG. 1A and FIGS. 2A-2B (e.g., the apparatus 300 having one or more components with the same or similar attributes as corresponding components of the apparatus 100), although the portion of the apparatus 300 of FIGS. 3A-3B can be in other components of the apparatus 300 besides the housing 110. For example, in certain embodiments, the electrically conductive layer 310 (e.g., which can be a portion of the housing 110 or a portion of another component of the apparatus 300 besides the housing) has one or more attributes (e.g., surface 312, first surface 314, second opposite surface 316) as described herein with regard to the electrically conductive portion 114 and/or the inductor 122 of FIGS. 1A and 2A-2B (e.g., surface 118, first surface 214, second opposite surface 216). For another example, in certain embodiments, the dielectric region 320 has one or more attributes (e.g., cavity 350, opening 352) as described herein with regard to the non-electrically-conductive region 116 of FIGS. 1A and 2A-2B (e.g., cavity 210, opening 212). For still another example, in certain embodiments, the at least one capacitor 330 and/or the circuit 340 has one or more attributes as described herein with regard to the at least one capacitor 124 and/or the circuit 120 of FIGS. 1A and 2A-2B.

Figure 4:
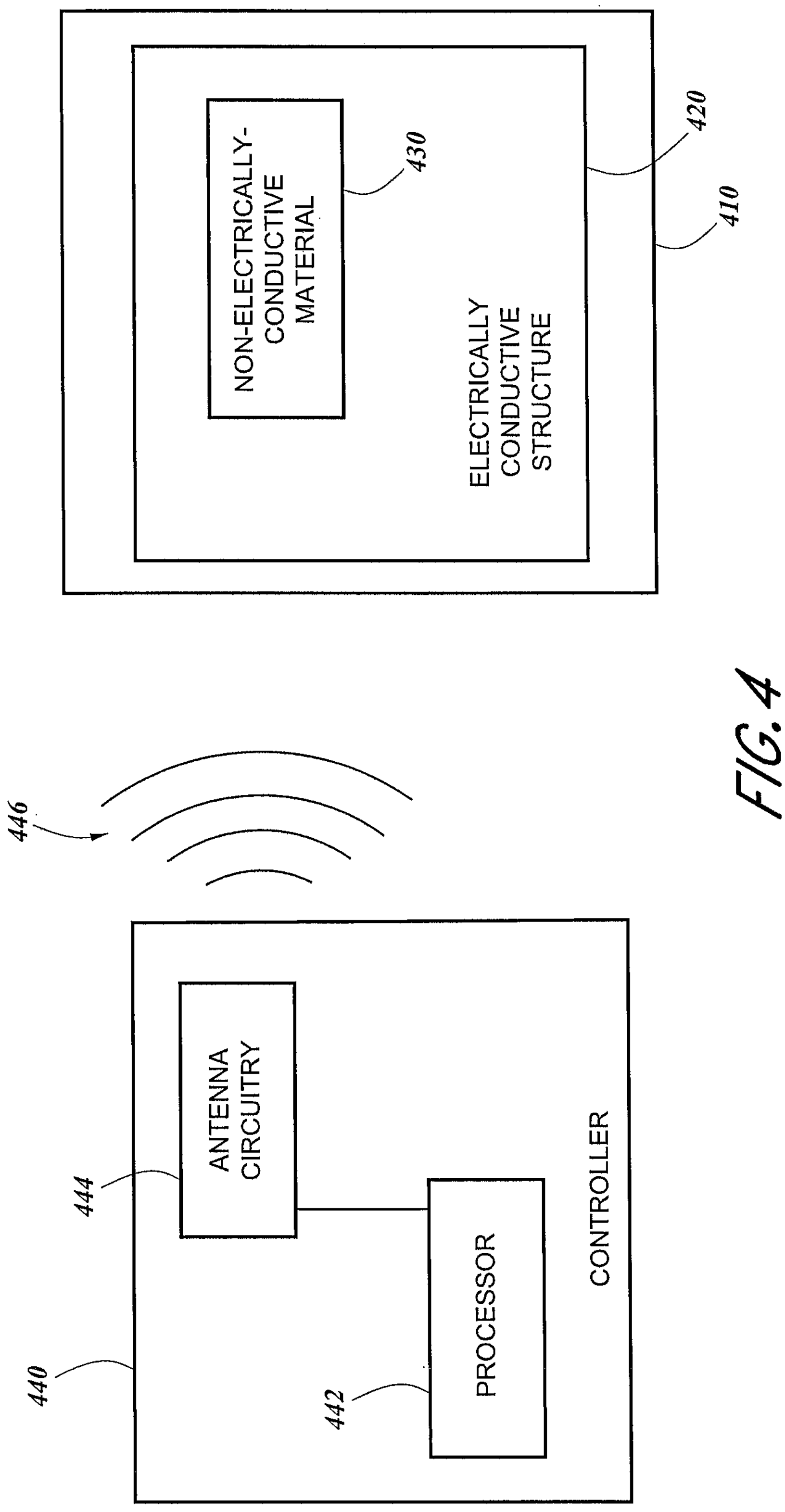
FIG. 4 schematically illustrates an example configuration in which an electronic device comprises an electrically conductive structure circumscribing a non-electrically-conductive material in accordance with certain embodiments described herein.

FIG. 4 schematically illustrates an example configuration 400 in which an electronic device 410 comprises an electrically conductive structure 420 circumscribing a non-electrically-conductive material 430 in accordance with certain embodiments described herein. The electrically conductive structure 420 can be configured to be operable as an antenna, e.g., for wireless communications with a controller 440, in accordance with certain embodiments described herein.

In certain embodiments, the electronic device 410 is selected from the group consisting of: a medical device, an auditory prosthesis, a hearing aid, a cochlear implant system, a component of an auditory prosthesis, a sound processor of an auditory prosthesis, an actuator of an auditory prosthesis, a magnetic coupler of an auditory prosthesis, a microphone of an auditory prosthesis, a battery, and a rechargeable battery. For example, the electronic device 410 can be an implantable component of an auditory prosthesis or a non-implantable component of an auditory prosthesis.

In certain embodiments (see, e.g., FIGS. 1A, 1B, and 2A-2D), the electrically conductive structure 420 comprises a circuit 120 comprising an inductor 122 (e.g., an electrically conductive portion 114 of the housing 110) and at least one capacitor 124 in electrical communication with the inductor 122, and the non-electrically-conductive material 430 circumscribed by the electrically conductive structure 420 comprises a non-electrically-conductive region 116 of the housing 110 bounded by the circuit 120. In certain other embodiments (see, e.g., FIGS. 3A-3B), the electrically conductive structure 420 comprises a circuit 340 comprising an electrically conductive layer 310 and at least one capacitor 330 in electrical communication with the electrically conductive layer 310, and the non-electrically-conductive material 430 circumscribed by the electrically conductive structure 420 comprises a dielectric region 320 within the electrically conductive layer 310. While the configuration 400 is described herein in relation to the structures of FIGS. 1A-1B, 2A-2D, and 3A-3B, other configurations and structures may be utilized as well in accordance with certain embodiments described herein.

In certain embodiments, the controller 440 comprises a second electronic device spaced from the electronic device 410 and configured to generate control signals and to wirelessly transmit the control signals to the electronic device 410. For example, in certain embodiments in which the electronic device 410 comprises a component of an auditory prosthesis (e.g., battery; sound processor), the controller 440 comprises a remote control unit for wirelessly controlling certain operation of the component of the auditory prosthesis, and the electronic device 410 is configured to respond to the control signals by adjusting or initiating certain operational states or operational parameters (e.g., stimulation rate; sound processing; battery life). The controller 440 of certain embodiments comprises a processor 442 configured to generate control signals for the electronic device 410 and antenna circuitry 444 in electrical communication with the processor 442 and configured to wirelessly transmit the control signals as a first plurality of electromagnetic signals 446 to the electronic device 410.

Figure 5A:
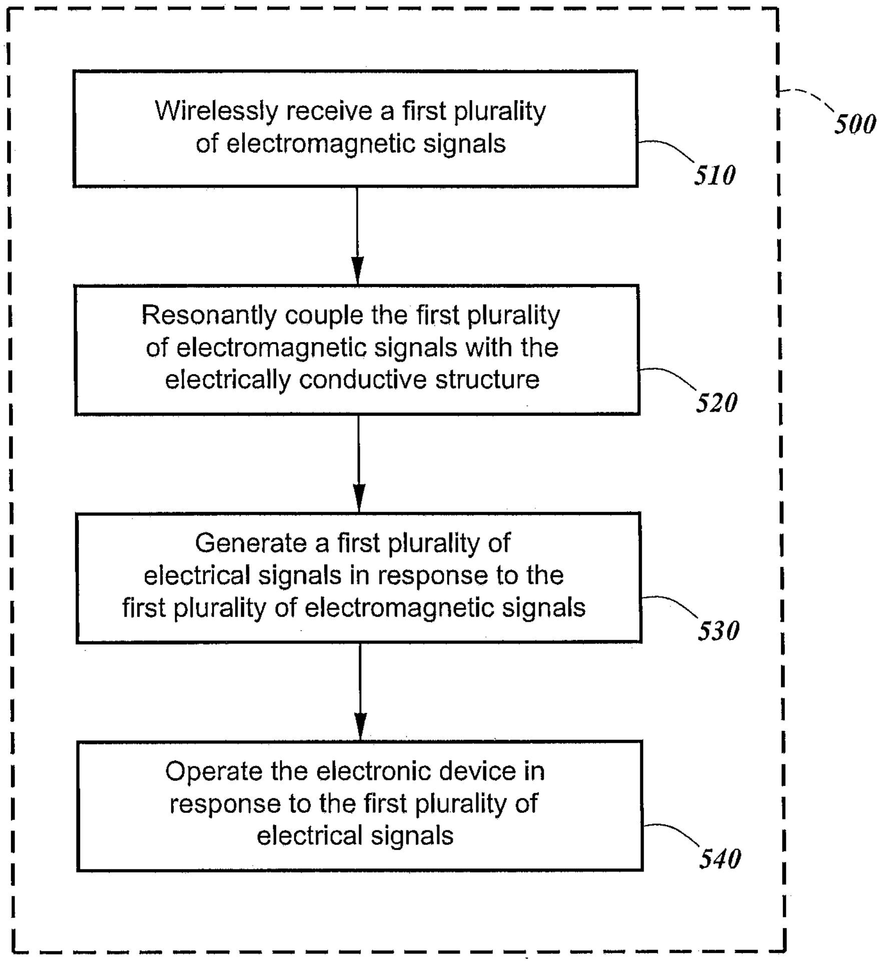
FIG. 5A is a flow diagram of an example method in accordance with certain embodiments described herein.

FIG. 5A is a flow diagram of an example method 500 in accordance with certain embodiments described herein. In an operational block 510, the method 500 comprises wirelessly receiving a first plurality of electromagnetic signals 446 at an electrically conductive structure 420 (e.g., circuit 120; circuit 340) of an electronic device 410. The electrically conductive structure 420 circumscribes a non-electrically-conductive material 430 and has a resonance frequency. The electrically conductive structure 420 comprises a portion of a housing of the electronic device 410 or a portion of an electrically-conductive layer of the electronic device 410. In an operational block 520, the method 500 further comprises resonantly coupling the first plurality of electromagnetic signals 446 with the electrically conductive structure 420. In an operational block 530, the method 500 further comprises generating a first plurality of electrical signals in response to the first plurality of electromagnetic signals 446. In an operational block 540, the method 500 further comprises operating the electronic device 410 in response to the first plurality of electrical signals. While the example method 500 is described herein in relation to the example structures schematically illustrated by FIGS. 1A, 1B, 2A-2D, 3A-3B, and 4, other structures are also compatible with certain embodiments described herein.

In certain embodiments, the first plurality of electromagnetic signals 446 are generated by the controller 440, which is spaced from the electronic device 410, and are wirelessly transmitted to the electrically conductive structure 420 prior to wirelessly receiving the first plurality of electromagnetic signals 446 at the electrically conductive structure 420 in the operational block 410. The first plurality of electromagnetic signals 446 can comprise control information to be used to control one or more operational functions of the electronic device 410. By transmitting the first plurality of electromagnetic signals from the controller 440 to the electrically conductive structure 420, certain embodiments wirelessly communicate control information to the electronic device 410 for controlling certain operation of the electronic device 410 (e.g., stimulation rate; sound processing; battery life; other operations of an auditory prosthesis).

Upon receiving the first plurality of electromagnetic signals 446, in the operational block 520, the first plurality of electromagnetic signals 446 are resonantly coupled with the electrically conductive structure 420 of the electronic device 410 (e.g., with the circuit 120; with the circuit 340). For example, the resonance frequency of the electrically conductive structure 420 can be in a predetermined range (e.g., in a range between 2 GHz and 6 GHz; in a range compatible with Bluetooth® wireless communication schemes), and the first plurality of electromagnetic signals 446 resonantly coupled with the electrically conductive structure 420 can have at least one frequency compatible with resonantly coupling with the electrically conductive structure 420 (e.g., within the predetermined range; equal to or within 10% of the resonance frequency).

In the operational block 530, a first plurality of electrical signals can be generated in response to the first plurality of electromagnetic signals 446 received at the electrically conductive structure 420. For example, the electrically conductive structure 420 can be in electrical communication with antenna circuitry of the electronic device 410 that is configured to transform (e.g., demodulate; decode) electromagnetic signals received by the electrically conductive structure 420 into electrical signals to be sent to one or more other components of the electronic device 410. In the operational block 540, these one or more other components of the electronic device 410 can be operated in response to the first plurality of electrical signals.

Figure 5B:
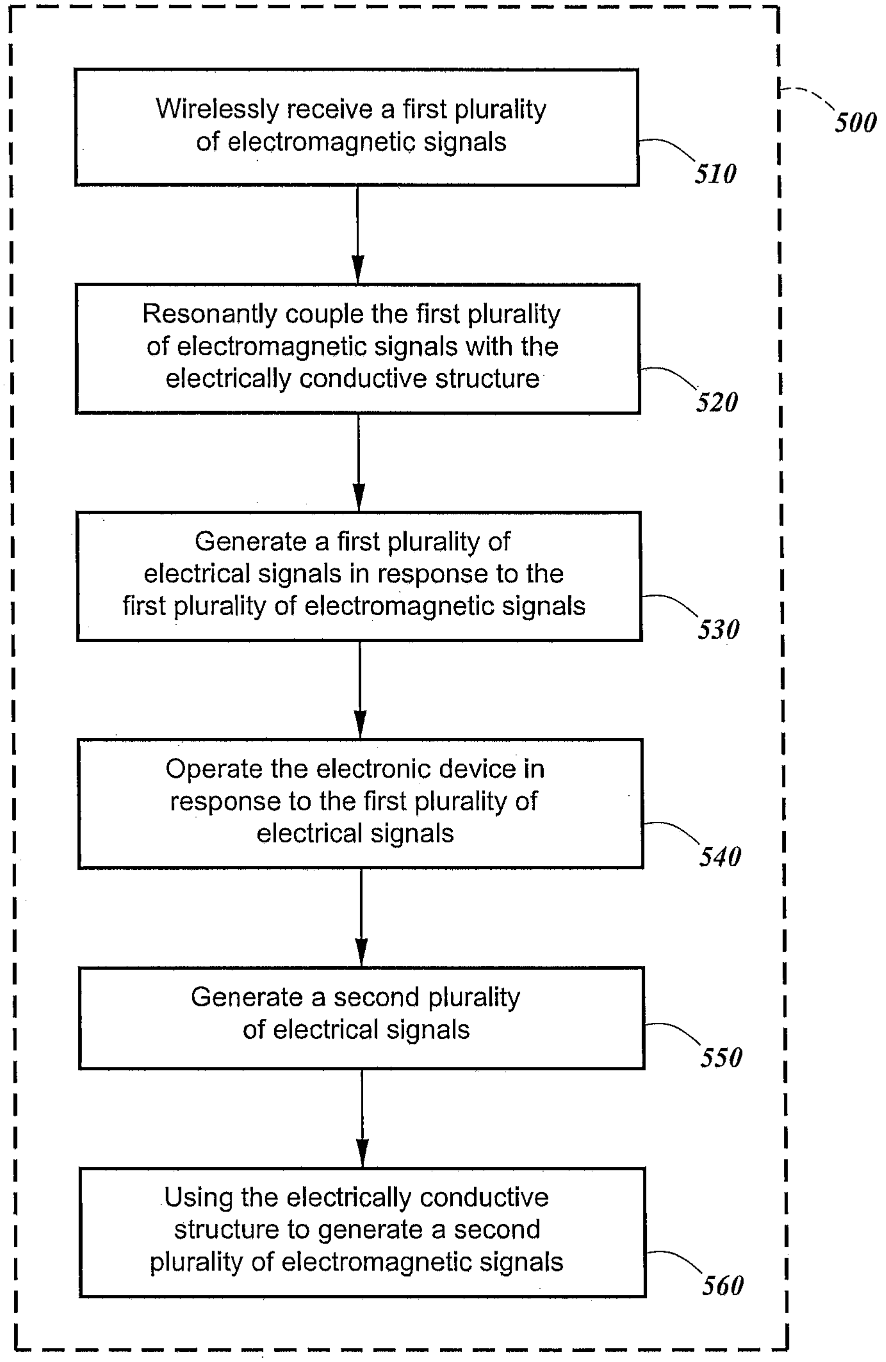
FIG. 5B is a flow diagram of another example method in accordance with certain embodiments described herein.

FIG. 5B is a flow diagram of another example method 500 in accordance with certain embodiments described herein. In addition to the operational blocks 510-540 disclosed herein, the method 500 can further comprise, in an operational block 550, generating a second plurality of electrical signals. For example, a processor or other circuitry of the electronic device 410 can generate a second plurality of electrical signals that are indicative of operational states or operational parameters of the electronic device 410 (e.g., stimulation rate; sound processing; battery life; other aspects of operation of an auditory prosthesis). The method 500 can further comprise, in an operational block 560, using the electrically conductive structure 420 to generate a second plurality of electromagnetic signals in response to the second plurality of electrical signals. For example, antenna circuitry of the electronic device 410 can receive the second plurality of electrical signals and can drive the electrically conductive structure 420 (e.g., modulate; encode) in response to the second plurality of electrical signals so as to generate the second plurality of electromagnetic signals. Driving the electrically conductive structure 420 can comprise modulating (e.g., encoding) a carrier signal to include information to be transmitted by the second plurality of electromagnetic signals. For example, by transmitting the second plurality of electromagnetic signals from the electrically conductive structure 420 to the controller 440 and receiving the second plurality of electromagnetic signals at the controller 440, certain embodiments wirelessly communicate the operational states or operational parameters of the electronic device 410 to the controller 440 (e.g., stimulation rate; sound processing; battery life; other operations of an auditory prosthesis).

Figure 6A:
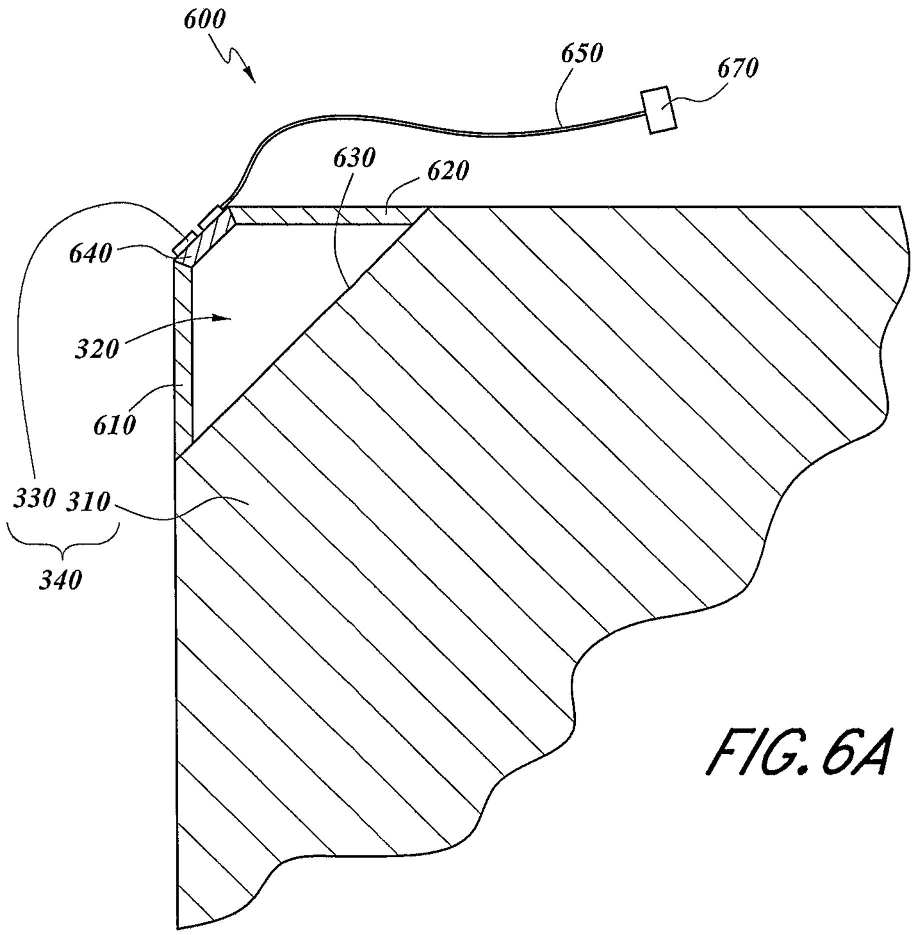
FIGS. 6A and 6B schematically illustrate a top view and a perspective view, respectively, of an example portion of an apparatus in accordance with certain embodiments described herein.
Figure 6B:
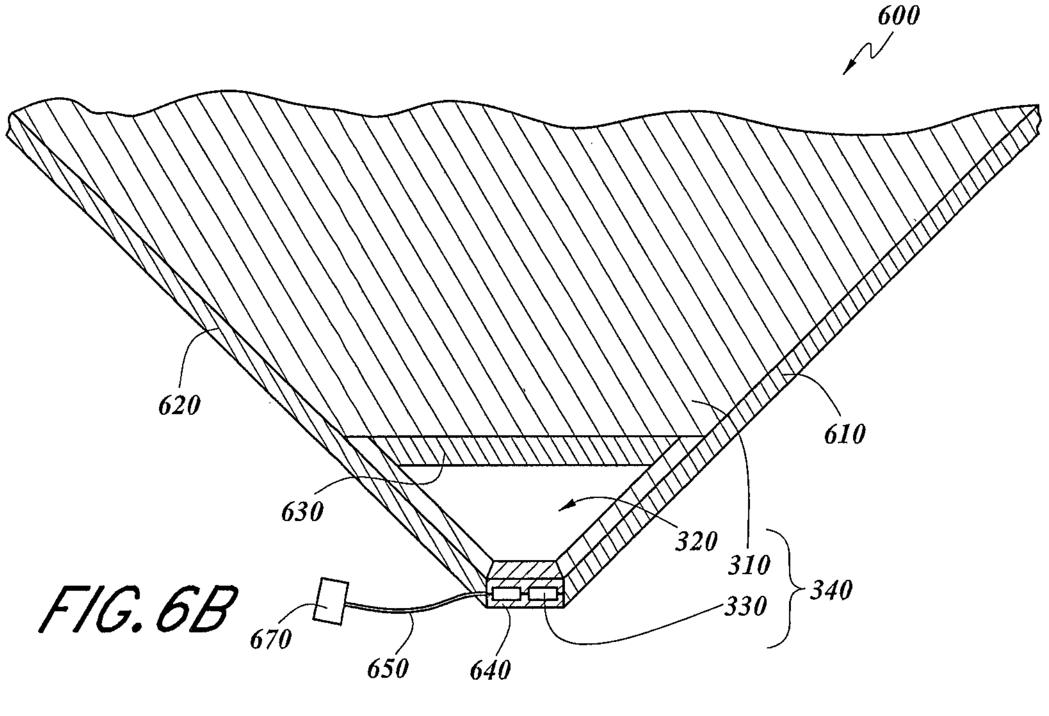

FIGS. 6A and 6B schematically illustrate a top view and a perspective view, respectively, of an example portion of an apparatus 600 in accordance with certain embodiments described herein. The apparatus 600 (e.g., battery; sound processor; component of an auditory prosthesis) comprises an electrically conductive layer 310 (e.g., an electrically conductive portion 114 of a housing 110), a dielectric region 320 (e.g., a cavity 210 comprising air) within the electrically conductive layer 310, and at least one capacitor 330 in electrical communication with the electrically conductive layer 310 to form a circuit 340.

As schematically shown in FIGS. 6A and 6B, the circuit 340 is at a corner of the housing 110 of the apparatus 600, with the housing 110 comprising an electrically conductive material (e.g., metal) and/or an electrically conductive surface. In certain other embodiments, the circuit 340 is at a corner of another electrically conductive portion of the apparatus 600, with the portion comprising an electrically conductive material (e.g., metal) and/or an electrically conductive surface.

The electrically conductive layer 310 comprises a first edge 610 and a second edge 620, with a portion of the first edge 610 and a portion of the second edge 620 bounding two sides of the dielectric region 320 (e.g., the cavity 210). A third edge 630 of the electrically conductive layer 310 bounds a third side of the dielectric region 320, and the at least one capacitor 330 bounds a fourth side of the dielectric region 320. The first edge 610, second edge 620, and third edge 630 can be in electrical communication with one another, and during operation of the apparatus 600, can be at an electrical reference (e.g., ground) voltage of the apparatus 600. The portion of the first edge 610, the portion of the second edge 620, and the third edge 630 can form an inductor 122 which is in electrical communication with the at least one capacitor 330 to form a circuit 120 bounding the dielectric region 320 (e.g., a non-electrically-conductive region of the housing 110; cavity 210). For example, a portion of the apparatus 600 can have the shape of a truncated corner of a rectangular parallelepiped, with the first edge 610 and the second edge 620 extended outward towards one another, and with the at least one capacitor 330 extending between, and in electrical communication with, the extended ends of the first edge 610 and the second edge 620. Other shapes and/or configurations of the cavity 210, circuit 340, first edge 610, second edge 620, and third edge 630 are also compatible with certain embodiments described herein.

In certain embodiments, the apparatus 600 comprises a non-electrically-conductive solid material 640 which serves as a substrate to mechanically support the at least one capacitor 330, while in certain other embodiments, the non-electrically-conductive solid material 640 is absent, and the at least one capacitor 330 is self-supporting and extends across an opening of the cavity 210 between the portion of the first edge 610 and the portion of the second edge 620 (e.g., the at least one capacitor 330 comprises a dielectric strip extending across the opening of the cavity 210 and supporting the at least one capacitor 330). The apparatus 600 of certain embodiments further comprises an electrical conduit 650 (e.g., wire; cable) in electrical communication with the at least one capacitor 330 and antenna circuitry 670 (e.g., transmitter; receiver; transceiver) of the apparatus 600. For example, the electrical conduit 650 can comprise a coaxial cable having a signal conduit and a shielding conduit, with one of the signal conduit and the shielding conduit in electrical communication with the at least one capacitor 330, and the other of the signal conduit and the shielding conduit in electrical communication with the inductor 122. The electrical conduit 650 can be configured to transmit electrical signals from the antenna circuitry to the circuit 340 and/or from the circuit 340 to the antenna circuitry.

Figure 7A:
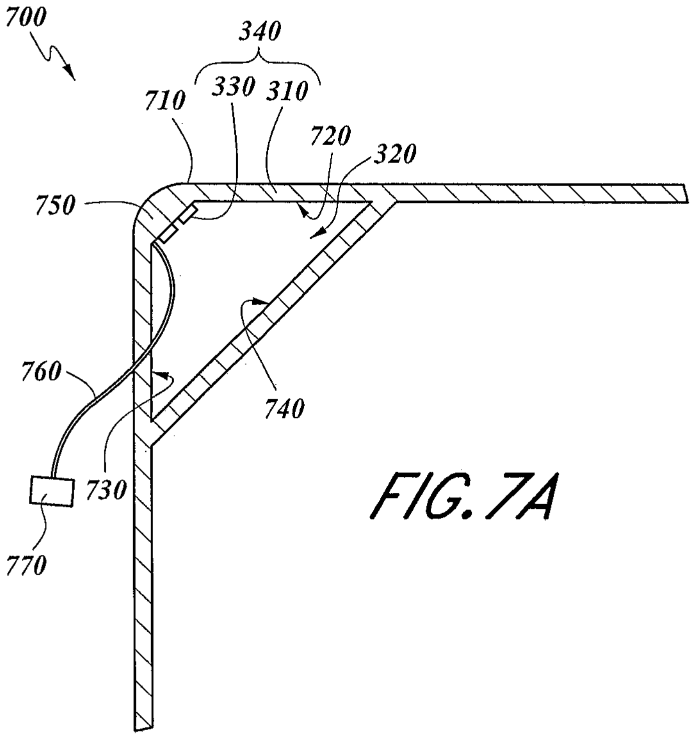
FIGS. 7A and 7B schematically illustrate a top view and a perspective view, respectively, of another example portion of an apparatus in accordance with certain embodiments described herein.
Figure 7B:
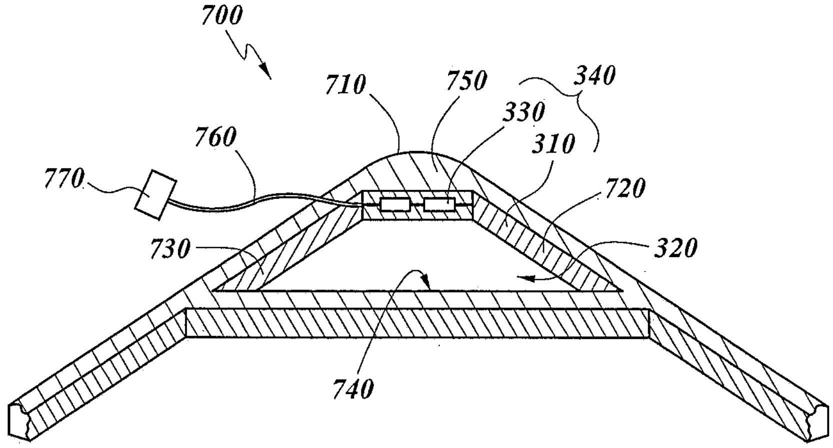

FIGS. 7A and 7B schematically illustrate a top view and a perspective view, respectively, of another example portion of an apparatus 700 in accordance with certain embodiments described herein. The apparatus 700 (e.g., battery; sound processor; component of an auditory prosthesis) comprises an electrically conductive layer 310 (e.g., an electrically conductive portion 114 of a housing 110), a dielectric region 320 (e.g., a cavity 210 comprising air) within the electrically conductive layer 310, and at least one capacitor 330 in electrical communication with the electrically conductive layer 310 to form a circuit 340.

As schematically shown in FIGS. 7A and 7B, the circuit 340 is on a substrate 710 comprising a non-electrically-conductive material (e.g., dielectric; ceramic; plastic; polymer) and is configured to be at a corner of a component of the apparatus 700 (e.g., the housing 110 of the apparatus 700). In certain embodiments, the substrate 710 and circuit 340 are integral with the other portions of the component of the apparatus 700, while in certain other embodiments, the substrate 710 and circuit 340 are a portion of the component of the apparatus 700 that is configured to be attachable to and detachable from the rest of the apparatus 700 (e.g., at a corner of the apparatus 700) without damage to the substrate 710, the circuit 340, or the rest of the apparatus 700. For example, the substrate 710 can have a shape configured to fit onto a portion of the apparatus 700 having the shape of a truncated corner of a rectangular parallelepiped. Other shapes and/or configurations of the substrate 710, cavity 210, circuit 340, first electrically conductive surface 720, second electrically conductive surface 730, and third electrically conductive surface 740 are also compatible with certain embodiments described herein.

The electrically conductive layer 310 comprises a first electrically conductive surface 720, a second electrically conductive surface 730, and a third electrically conductive surface 740, with the first electrically conductive surface 720, second electrically conductive surface 730, and third electrically conductive surface 740 on the substrate 710 (e.g., deposited onto respective portions of the substrate 710) and bounding three sides of the dielectric region 320 (e.g., a non-electrically-conductive region of the housing 110; cavity 210). The at least one capacitor 330 bounds a fourth side of the dielectric region 320. The first electrically conductive surface 720, second electrically conductive surface 730, and third electrically conductive surface 740 can be in electrical communication with one another, and during operation of the apparatus 700, can be at an electrical reference (e.g., ground) voltage of the apparatus 700. The first electrically conductive surface 720, second electrically conductive surface 730, and third electrically conductive surface 740 can form an inductor 122 which is in electrical communication with the at least one capacitor 330 to form a circuit 120 bounding the dielectric region 320 (e.g., the cavity 210).

In certain embodiments, as schematically illustrated by FIGS. 7A and 7B, a non-electrically-conductive portion 750 of the substrate 710 mechanically supports the at least one capacitor 330, while in certain other embodiments, the portion 750 of the substrate 710 is absent, and the at least one capacitor 330 is self-supporting and extends across an opening of the cavity 210 between the portion of the first electrically conductive surface 720 and the portion of the second electrically conductive surface 730 (e.g., the at least one capacitor 330 comprises a dielectric strip extending across the opening of the cavity 210 and supporting the at least one capacitor 330). The apparatus 700 of certain embodiments further comprises an electrical conduit 760 (e.g., wire; cable) in electrical communication with the at least one capacitor 330 and antenna circuitry 770 (e.g., transmitter; receiver; transceiver) of the apparatus 700. For example, the electrical conduit 760 can comprise a coaxial cable having a signal conduit and a shielding conduit, with one of the signal conduit and the shielding conduit in electrical communication with the at least one capacitor 330 and the other of the signal conduit and the shielding conduit in electrical communication with the inductor 122. The electrical conduit 760 can be configured to transmit electrical signals from the antenna circuitry to the circuit 340 and/or from the circuit 340 to the antenna circuitry.

Figure 8A:
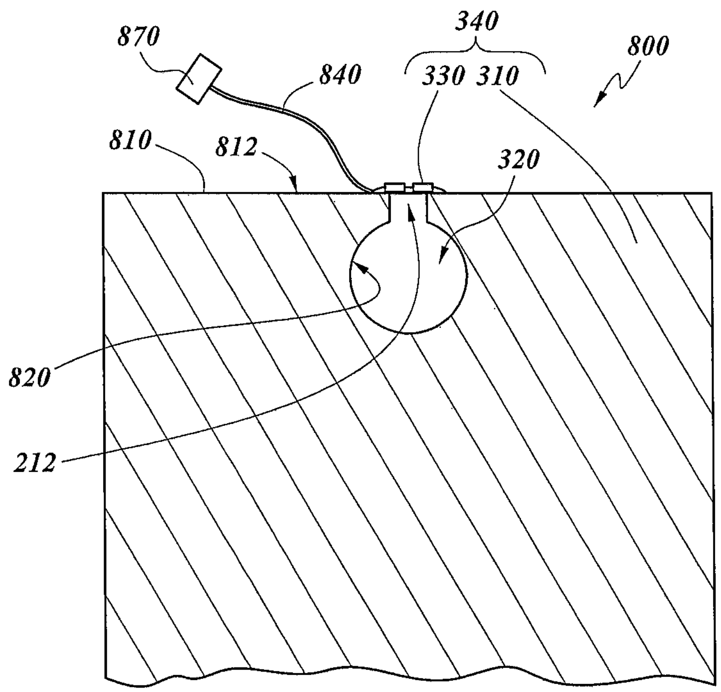
FIGS. 8A and 8B schematically illustrate a top view and a perspective view, respectively, of another example portion of an apparatus in accordance with certain embodiments described herein.
Figure 8B:
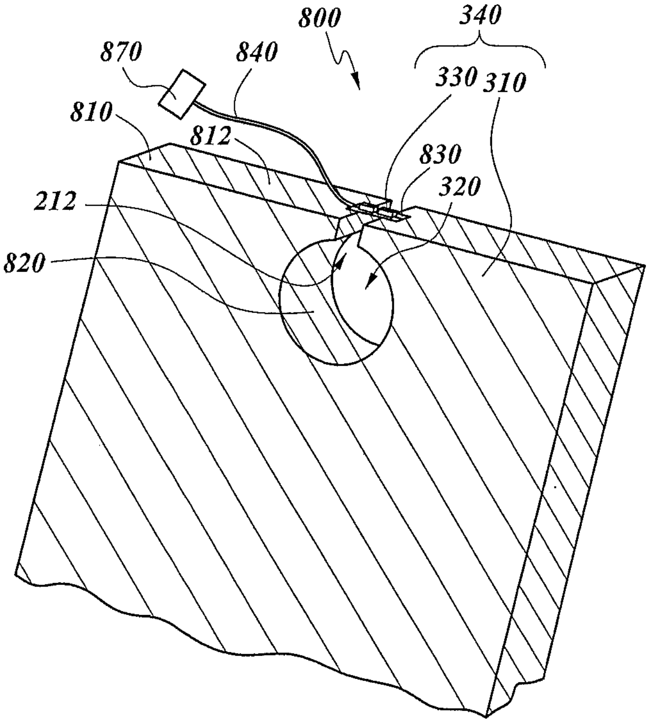

FIGS. 8A and 8B schematically illustrate a top view and a perspective view, respectively, of another example portion of an apparatus 800 in accordance with certain embodiments described herein. The apparatus 800 (e.g., battery; sound processor; component of an auditory prosthesis) comprises an electrically conductive layer 310 (e.g., an electrically conductive portion 114 of a housing 110), a dielectric region 320 (e.g., a cavity 210 comprising air) within the electrically conductive layer 310, and at least one capacitor 330 in electrical communication with the electrically conductive layer 310 to form a circuit 340.

As schematically shown in FIGS. 8A and 8B, the circuit 340 is at a side of the housing 110 of the apparatus 800 (e.g., a flat side), with the housing 110 comprising an electrically conductive material (e.g., metal) and/or an electrically conductive surface. In certain other embodiments, the circuit 340 is at a side of another electrically conductive portion of the apparatus 800, with the portion comprising an electrically conductive material (e.g., metal) and/or an electrically conductive surface.

The electrically conductive layer 310 comprises a first surface 810 at an edge 812 of the housing 110 and a second surface 820 defining a cavity 210 and an opening 212 of the cavity 210 at the edge 812, with the second surface 820 bounding a portion of the dielectric region 320 (e.g., the cavity 210). The at least one capacitor 330 extends across the opening 212 and bounds a remaining portion of the dielectric region 320. The first surface 810 and the second surface 820 can be in electrical communication with one another, and during operation of the apparatus 800, can be at an electrical reference (e.g., ground) voltage of the apparatus 800. The second surface 820 can form an inductor 122 which is in electrical communication with the at least one capacitor 330 to form a circuit 120 bounding the dielectric region 320 (e.g., a non-electrically-conductive region of the housing 110; cavity 210). For example, as schematically illustrated in FIGS. 8A and 8B, the cavity 210 can have a substantially circular shape, and with the at least one capacitor 330 extending across the opening 212 between, and in electrical communication with, a first portion of the first surface 810 and a second portion of the first surface 810. Other shapes and/or configurations of the cavity 210, circuit 340, first surface 810, second surface 820, and edge 812 are also compatible with certain embodiments described herein.

In certain embodiments, the apparatus 800 comprises a non-electrically-conductive solid material 830 which serves as a substrate to mechanically support the at least one capacitor 330, while in certain other embodiments, the non-electrically-conductive solid material 830 is absent, and the at least one capacitor 330 is self-supporting and extends across the opening 212 (e.g., the at least one capacitor 330 comprises a dielectric strip extending across the opening 212 and supporting the at least one capacitor 330). The apparatus 800 of certain embodiments further comprises an electrical conduit 840 (e.g., wire; cable) in electrical communication with the at least one capacitor 330 and antenna circuitry 870 (e.g., transmitter; receiver; transceiver) of the apparatus 800. For example, the electrical conduit 840 can comprise a coaxial cable having a signal conduit and a shielding conduit, with one of the signal conduit and the shielding conduit in electrical communication with the at least one capacitor 330 and the other of the signal conduit and the shielding conduit in electrical communication with the inductor 122. The electrical conduit 840 can be configured to transmit electrical signals from the antenna circuitry to the circuit 340 and/or from the circuit 340 to the antenna circuitry.

Figure 9:
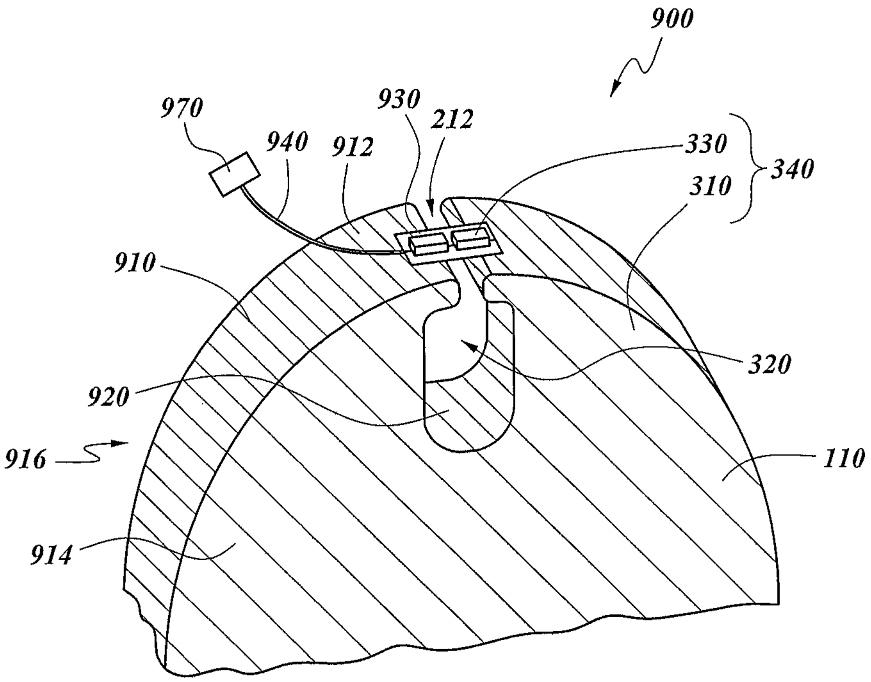
FIG. 9 schematically illustrates a perspective view of an example portion of an apparatus in accordance with certain embodiments described herein.

FIG. 9 schematically illustrates a perspective view of an example portion of an apparatus 900 in accordance with certain embodiments described herein. The apparatus 900 (e.g., battery; sound processor; component of an auditory prosthesis) comprises an electrically conductive layer 310 (e.g., an electrically conductive portion 114 of a housing 110), a dielectric region 320 (e.g., a cavity 210 comprising air) within the electrically conductive layer 310, and at least one capacitor 330 in electrical communication with the electrically conductive layer 310 to form a circuit 340.

As schematically shown in FIG. 9, the circuit 340 is at a side of the housing 110 of the apparatus 900 (e.g., a curved side), with the housing 110 comprising an electrically conductive material (e.g., metal) and/or an electrically conductive surface. In certain other embodiments, the circuit 340 is at a side of another electrically conductive portion of the apparatus 900, with the portion comprising an electrically conductive material (e.g., metal) and/or an electrically conductive surface.

As schematically illustrated by FIG. 9, the electrically conductive layer 310 comprises a first surface 910 at an edge 912 of the housing 110 and a second surface 920 defining a cavity 210 and an opening 212 of the cavity 210 at the edge 912, with the second surface 920 bounding a portion of the dielectric region 320 (e.g., the cavity 210). As schematically illustrated by FIG. 9, the cavity 210 extends from a first surface 914 of the housing 110 to a second surface 916 opposite to the first surface 914, and comprises an opening 212 at the edge 912 of the housing 110.

In FIG. 9, the opening 212 has a long dimension and a short dimension, and the at least one capacitor 330 extends across the opening 212 along the short dimension. While the second surface 920 bounds a portion of the dielectric region 320 (e.g., the cavity 210), the at least one capacitor 330 bounds a remaining portion of the dielectric region 320. During operation of the apparatus 900, the first surface 910 and the second surface 920 can be at an electrical reference (e.g., ground) voltage of the apparatus 900. The second surface 820 can form an inductor 122 which is in electrical communication with the at least one capacitor 330 to form a circuit 120 bounding the dielectric region 320 (e.g., a non-electrically-conductive region of the housing 110; cavity 210). For example, as schematically illustrated in FIG. 9, the at least one capacitor 330 extends across the opening 212 along the short dimension between, and in electrical communication with, a first portion of the first surface 910 and a second portion of the first surface 910. Other shapes and/or configurations of the cavity 210, opening 212, circuit 340, first surface 910, second surface 920, and edge 912 are also compatible with certain embodiments described herein.

In certain embodiments, the apparatus 900 comprises a non-electrically-conductive solid material 930 which serves as a substrate to mechanically support the at least one capacitor 330, while in certain other embodiments, the non-electrically-conductive solid material 930 is absent, and the at least one capacitor 330 is self-supporting and extends across the opening 212. The apparatus 900 of certain embodiments further comprises an electrical conduit 940 (e.g., wire; cable) in electrical communication with the at least one capacitor 330 and antenna circuitry 970 (e.g., transmitter; receiver; transceiver) of the apparatus 900. For example, the electrical conduit 940 can comprise a coaxial cable having a signal conduit and a shielding conduit, with one of the signal conduit and the shielding conduit in electrical communication with the at least one capacitor 330 and the other of the signal conduit and the shielding conduit in electrical communication with the inductor 122. The electrical conduit 940 can be configured to transmit electrical signals from the antenna circuitry to the circuit 340 and/or from the circuit 340 to the antenna circuitry.

It is to be appreciated that the embodiments disclosed herein are not mutually exclusive and may be combined with one another in various arrangements.

The invention described and claimed herein is not to be limited in scope by the specific example embodiments herein disclosed, since these embodiments are intended as illustrations, and not limitations, of several aspects of the invention. Any equivalent embodiments are intended to be within the scope of this invention. Indeed, various modifications of the invention in form and detail, in addition to those shown and described herein, will become apparent to those skilled in the art from the foregoing description. Such modifications are also intended to fall within the scope of the claims. The breadth and scope of the invention should not be limited by any of the example embodiments disclosed herein, but should be defined only in accordance with the claims and their equivalents.

Certain Embodiments

Certain embodiments are listed below. The following embodiments are presented for explanatory and illustrative purposes only. It will be appreciated that the foregoing description is not limited to the following embodiments.

Embodiment 1: An apparatus comprising: a housing; and a circuit comprising an inductor and at least one capacitor in electrical communication with the inductor, the circuit having a resonance frequency and bounding a non-electrically-conductive region of the housing, wherein the circuit is configured to be operable as an antenna.

Embodiment 2: The apparatus of Embodiment 1, wherein the apparatus comprises an electronic device selected from the group consisting of: a medical device, an auditory prosthesis, a hearing aid, a cochlear implant system, a component of an auditory prosthesis, a sound processor of an auditory prosthesis, an actuator of an auditory prosthesis, a magnetic coupler of an auditory prosthesis, a microphone of an auditory prosthesis, a battery, and a rechargeable battery.

Embodiment 3: The apparatus of Embodiment 1 or Embodiment 2, wherein the inductor comprises an electrically conductive portion of the housing, the non-electrically-conductive region within the electrically conductive portion.

Embodiment 4: The apparatus of Embodiment 3, wherein the non-electrically-conductive region is planar.

Embodiment 5: The apparatus of Embodiment 3, wherein the electrically conductive portion of the housing comprises a portion of at least one surface of the housing.

Embodiment 6: The apparatus of Embodiment 3, wherein, during operation of the apparatus, the electrically conductive portion of the housing is at an electrical reference voltage of the apparatus.

Embodiment 7: The apparatus of any of Embodiments 1 to 6, wherein the non-electrically-conductive region of the housing comprises a dielectric material selected from the group consisting of: air, ceramic, plastic, and polymer.

Embodiment 8: The apparatus of Embodiment 7, wherein the non-electrically-conductive region of the housing comprises a cavity comprising air and an opening at a surface of the housing, the at least one capacitor extending across the opening.

Embodiment 9: The apparatus of any of Embodiments 1 to 8, wherein the resonance frequency is in a range between 2 GHz and 6 GHz.

Embodiment 10: The apparatus of any of Embodiments 1 to 9, further comprising a controller spaced from the housing, the controller configured to wirelessly transmit electromagnetic signals to the circuit, to receive wirelessly transmitted electromagnetic signals from the circuit, or both.

Embodiment 11: An apparatus comprising: an electrically conductive layer; a dielectric region within the electrically conductive layer; and at least one capacitor in electrical communication with the electrically conductive layer to form a circuit having a resonance frequency and configured to be operable as an antenna.

Embodiment 12: The apparatus of Embodiment 11, wherein the apparatus comprises an electronic device selected from the group consisting of: a medical device, an auditory prosthesis, a hearing aid, a cochlear implant system, a component of an auditory prosthesis, a sound processor of an auditory prosthesis, an actuator of an auditory prosthesis, a magnetic coupler of an auditory prosthesis, a microphone of an auditory prosthesis, a battery, and a rechargeable battery.

Embodiment 13: The apparatus of Embodiment 11 or Embodiment 12, wherein the dielectric region comprises a cavity substantially circumscribed by the electrically conductive layer and comprising an opening at a surface of the electrically conductive layer, the at least one capacitor extending across the opening.

Embodiment 14: The apparatus of any of Embodiments 11 to 13, wherein the resonance frequency is in a range between 2 GHz and 6 GHz.

Embodiment 15: The apparatus of any of Embodiments 11 to 14, further comprising a controller spaced from the circuit, the controller configured to wirelessly transmit electromagnetic signals to the circuit, to receive wirelessly transmitted electromagnetic signals from the circuit, or both.

Embodiment 16: A method comprising: wirelessly receiving a first plurality of electromagnetic signals at an electrically conductive structure of an electronic device, the electrically conductive structure circumscribing a non-electrically-conductive material, the electrically conductive structure having a resonance frequency, the electrically conductive structure comprising a portion of a housing of the electronic device or a portion of an electrically-conductive layer of the electronic device; resonantly coupling the first plurality of electromagnetic signals with the electrically conductive structure; generating a first plurality of electrical signals in response to the first plurality of electromagnetic signals; and operating the electronic device in response to the first plurality of electrical signals.

Embodiment 17: The method of Embodiment 16, further comprising: generating a second plurality of electrical signals; and using the electrically conductive structure to generate a second plurality of electromagnetic signals in response to the second plurality of electrical signals.

Embodiment 18: The method of Embodiment 17, further comprising: transmitting the first plurality of electromagnetic signals from a controller of the electronic device to the electrically conductive structure, wherein the controller is spaced from the electronic device; and transmitting the second plurality of electromagnetic signals from the electrically conductive structure to the controller.

Embodiment 19: The method of Embodiment 18, further comprising receiving the second plurality of electromagnetic signals at the controller.

Embodiment 20: The method of any of Embodiments 16 to 19, wherein the electrically conductive structure comprises a circuit comprising an inductor and at least one capacitor in electrical communication with the inductor.

What is claimed is:

1. An apparatus comprising:

a slab-shaped portion of a housing, the slab-shaped portion comprising a first surface, a second surface opposite to the first surface, and an electrically conductive material between the first surface and the second surface;

a region within the slab-shaped portion between the first surface and the second surface and bordered by the electrically conductive material;

a dielectric material within the region; and at least one capacitor extending along a periphery of the dielectric material, the at least one capacitor in electrical communication with the electrically conductive material to form a circuit having a resonance frequency and configured to be operable as an antenna.

2. The apparatus of claim 1, wherein the apparatus comprises an electronic device selected from the group consisting of: a medical device, an auditory prosthesis, a hearing aid, a cochlear implant system, a component of an auditory prosthesis, a sound processor of an auditory prosthesis, an actuator of an auditory prosthesis, a magnetic coupler of an auditory prosthesis, a microphone of an auditory prosthesis, a battery, and a rechargeable battery.

3. The apparatus of claim 1, wherein the region comprises a cavity substantially circumscribed by the electrically conductive material and comprising an opening at a surface of the electrically conductive material, the at least one capacitor extending across the opening.

4. The apparatus of claim 1, wherein the resonance frequency is in a range between 2 GHz and 6 GHz.

5. The apparatus of claim 1, further comprising a controller spaced from the circuit, the controller configured to wirelessly transmit electromagnetic signals to the circuit, to receive wirelessly transmitted electromagnetic signals from the circuit, or both.

6. The apparatus of claim 1, wherein the slab-shaped portion is planar and the region is planar and coplanar with the slab-shaped portion.

7. The apparatus of claim 1, wherein, during operation of the apparatus, the electrically conductive material is at an electrical reference voltage of the apparatus.

8. The apparatus of claim 1, wherein the dielectric material is selected from the group consisting of: air, ceramic, plastic, and polymer.

9. The apparatus of claim 1, wherein the region extends to the first surface and to the second surface.

10. The apparatus of claim 1, wherein the region extends to the first surface and not to the second surface.

11. The apparatus of claim 1, wherein the region does not extend to the first surface and does not extend to the second surface.

* * * * *